(12) United States Patent
Lee et al.

(10) Patent No.: US 11,588,440 B2
(45) Date of Patent: Feb. 21, 2023

(54) TEST APPARATUS OF SOLAR CELL, AND PHOTOVOLTAIC SYSTEM INCLUDING THE SAME

(71) Applicant: LG ELECTRONICS INC., Seoul (KR)

(72) Inventors: Jaehoon Lee, Seoul (KR); Kyongpil Tae, Seoul (KR); Bohyun Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 125 days.

(21) Appl. No.: 17/024,432

(22) Filed: Sep. 17, 2020

(65) Prior Publication Data

US 2021/0083622 A1 Mar. 18, 2021

(30) Foreign Application Priority Data

Sep. 17, 2019 (KR) .................. 10-2019-0114155

(51) Int. Cl.
*H02S 50/10* (2014.01)
*H02S 40/36* (2014.01)

(52) U.S. Cl.
CPC .............. *H02S 50/10* (2014.12); *H02S 40/36* (2014.12)

(58) Field of Classification Search
CPC ................................ H02S 50/10; H02S 40/36
See application file for complete search history.

(56) References Cited

FOREIGN PATENT DOCUMENTS

| CN | 108614612 B | * | 2/2021 | .............. G05F 1/67 |
| JP | 2004046727 A | * | 2/2004 | |
| JP | 2012015199 A | * | 1/2012 | |
| WO | WO-2017221463 A1 | * | 12/2017 | .............. H02J 3/38 |

* cited by examiner

*Primary Examiner* — Natalie Huls
*Assistant Examiner* — Cynthia L Davis
(74) *Attorney, Agent, or Firm* — Lee Hong Degerman Kang Waimey

(57) ABSTRACT

Disclosed are a test apparatus of a solar cell and a photovoltaic system including the same. A test apparatus of a solar cell according to an embodiment of the present disclosure includes an interface to receive cell information including cell efficiency, cell voltage, and cell current and a processor to perform learning based on the cell information of the solar cell and line information of a string line including the solar cell, predict an output of a solar cell module including the solar cell based on the learning, and output an output prediction value of the solar cell module. As a result, an output deviation of the solar cell module including a plurality of solar cells can be reduced.

14 Claims, 15 Drawing Sheets

FIG. 10A

| PREDICTION MODEL | 335 W RATING | 340 W RATING |
|---|---|---|
| PREDICTION A | 23.00% | 23.40% |
| PREDICTION B | 22.95% | 23.24% |
| ACTUAL MEASUREMENT RESULT | 22.96% | 23.25% |

TEST APPARATUS OF SOLAR CELL, AND PHOTOVOLTAIC SYSTEM INCLUDING THE SAME

CROSS-REFERENCE TO RELATED APPLICATION

Pursuant to 35 U.S.C. § 119(a), this application claims the benefit of earlier filing date and right of priority to Korean Patent Application No. 10-2019-0114155, filed on Sep. 17, 2019, the contents of which are hereby incorporated by reference herein in its entirety.

BACKGROUND OF THE DISCLOSURE

1. Field of the Disclosure

The present disclosure relates to a test apparatus of a solar cell, and a photovoltaic system including the same, and more particularly, to a test apparatus of a solar cell, and a photovoltaic system including the same capable of reducing an output deviation of a solar cell module including a plurality of solar cells.

2. Related Art

In a cell manufacturing stage, a cell efficiency rating is given to a solar cell. In particular, the cell efficiency rating is given by an output, light, and the like of the solar cell.

A solar module having a target output of approximately 350, 355, or 360 Watt is produced in a combination of 60 or 72 solar cells by using such cell efficiency rating information.

However, when the solar cell module is manufactured by classifying cell ratings based on cell efficiency, an output dispersion of the solar cell module is large, and as a result, there is a case in which a minimum output requirement of approximately 350, 355, or 360 Watt as the target output is not satisfied. In addition, there is also a problem in that production efficiency deteriorates.

SUMMARY OF THE DISCLOSURE

The present disclosure provides a test apparatus of a solar cell, and a photovoltaic system including the same capable of reducing an output deviation of a solar cell module including a plurality of solar cells.

The present disclosure also provides a test apparatus of a solar cell, and a photovoltaic system including the same capable of enhancing production efficiency of a solar cell module including a plurality of solar cells.

In an aspect, provided is a test apparatus of a solar cell, which includes: an interface to receive cell information including cell efficiency, cell voltage, and cell current of a solar cell; and a processor to perform learning based on the cell information of the solar cell and line information of a string line including the solar cell, predict an output of a solar cell module including the solar cell based on the learning, and output an output prediction value of the solar cell module.

Meanwhile, the processor may perform the learning based on the cell information of the solar cell, the line information of the string line including the solar cell, and module information of the solar cell module including the string line, predict the output of the solar cell module based on the learning, and output the output prediction value of the solar cell module.

The test apparatus of a solar cell may further include a communicator to receive a learning model from a server, in which the processor may perform the learning based on the learning model and predict the output of the solar cell module based on the learning.

The test apparatus of a solar cell according may further include a second interface to transmit the output prediction value of the solar cell module to a solar cell classifying apparatus.

Meanwhile, the cell information may further include resistance information and temperature information of the solar cell.

Meanwhile, in case in which a cell rating is given based on the cell efficiency, the solar cell module may include a solar cell of a reference value or more and in case in which the cell rating is given based on the output prediction value, the solar cell module may include a solar cell having cell efficiency equal to or higher than a second reference value lower than the first reference value.

In another aspect, provided is a photovoltaic system which includes: a solar cell test apparatus to receive cell information including cell efficiency, cell voltage, and cell current of a solar cell, perform learning based on the cell information of the solar cell and line information of a string line including the solar cell, predict an output of a solar cell module including the solar cell based on the learning, and output an output prediction value of the solar cell module; and a solar cell classifying apparatus to classify a rating of the solar cell based on the output prediction value of the solar cell module from the solar cell test apparatus.

Meanwhile, the solar cell classifying apparatus may classify the ratings of the solar cell for each output power of the solar cell module.

Meanwhile, the solar cell test apparatus may perform the learning based on the cell information of the solar cell, the line information of the string line including the solar cell, and module information of the solar cell module including the string line, predict the output of the solar cell module based on the learning, and output the output prediction value of the solar cell module.

The photovoltaic system may further include a server to perform learning by using the cell information of the solar cell and a plurality of learning models, select any one learning model of the plurality of learning models, and transmit the selected learning model to the solar cell test apparatus.

Meanwhile, the solar cell test apparatus may perform learning based on the learning model received from the server and predict the output of the solar cell module.

Meanwhile, the plurality of learning models may include a plurality of machine learning model and a plurality of regression analysis learning model.

Meanwhile, the cell information may further include resistance information and temperature information of the solar cell.

Meanwhile, in case in which a cell rating is given based on the cell efficiency, the solar cell module may include a solar cell of a reference value or more and in case in which the cell rating is given based on the output prediction value, the solar cell module may include a solar cell having cell efficiency equal to or higher than a second reference value lower than the first reference value.

In yet another aspect, provided is a test apparatus of a solar cell, which includes: an interface to receive cell information including cell efficiency, cell voltage, and cell current of a solar cell; and a processor to perform learning based on the cell information of the solar cell and line information of a string line including the solar cell, predict an output of a solar cell module including the solar cell based on the learning, output an output prediction value of the solar cell module, and classify a rating of the solar cell based on the output prediction value of the solar cell module.

Meanwhile, the processor can perform the learning based on the cell information of the solar cell, the line information of the string line including the solar cell, and module information of the solar cell module including the string line, predict the output of the solar cell module based on the learning, and output the output prediction value of the solar cell module.

The test apparatus of a solar cell may further include a communicator to receive a learning model from a server, in which the processor may perform the learning based on the learning model and predict the output of the solar cell module based on the learning.

Meanwhile, the cell information may further include resistance information and temperature information of the solar cell.

Meanwhile, in case in which a cell rating is given based on the cell efficiency, the solar cell module may include a solar cell of a reference value or more and in case in which the cell rating is given based on the output prediction value, the solar cell module may include a solar cell having cell efficiency equal to or higher than a second reference value lower than the first reference value.

BRIEF DESCRIPTION OF THE DRAWINGS

The above and other objects, features and advantages of the present disclosure will be more apparent from the following detailed description in conjunction with the accompanying drawings, in which.

DESCRIPTION OF EMBODIMENTS

Hereinafter, the present disclosure will be described in more detail with reference to the drawings.

Suffixes "module" and "unit" for components used in the following description are given in consideration of easy preparation of the specification only and do not have their own particularly important meanings or roles. Accordingly, the "module" and "unit" may be used interchangeably.

Figure 1:
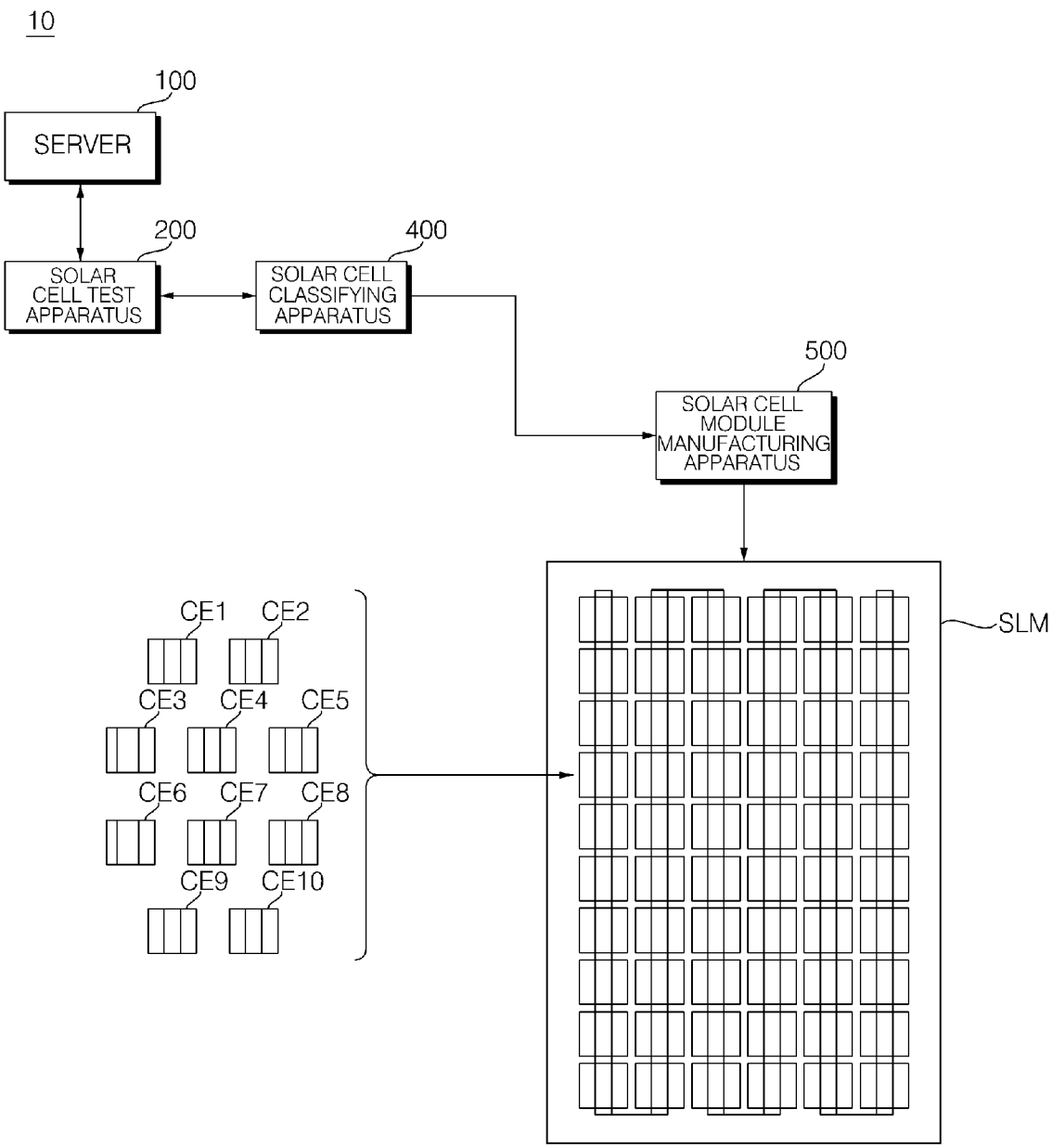
FIG. 1 is a diagram illustrating an example of a photovoltaic system including a test apparatus of a solar cell according to an embodiment of the present disclosure.

FIG. 1 is a diagram illustrating an example of a photovoltaic system including a test apparatus of a solar cell according to an embodiment of the present disclosure.

Referring to FIG. 1, a photovoltaic system 10 according to an embodiment of the present disclosure may include a solar cell module SLM including a plurality of solar cells CE1 to CE10, a solar cell test apparatus 200 outputting an output prediction value of the solar cell module SLM, a solar cell classifying apparatus 400 classifying ratings of the solar cells CE1 to CE10, a solar cell module manufacturing apparatus 500 manufacturing the solar cells CE1 to CE10, and a server 100.

The solar cell module manufacturing apparatus 500 may manufacture the plurality of solar cells CE1 to CE 10 by various processes.

In FIG. 1, it is exemplified that the number of solar cells CE1 to CE10 is 10, but is not limited thereto and the plurality of solar cells may be manufactured.

Meanwhile, at the time of manufacturing the solar cell module SLM based on the plurality of solar cells CE1 to CE10, when the solar cell module is manufactured by classifying the cell ratings based on cell efficiency (e.g., based on photoelectric conversion efficiency), there is a disadvantage that an output dispersion of the solar cell module SLM increases.

In particular, in addition to the cell efficiency of the plurality of solar cells CE1 to CE10, due to current characteristics (Isc), voltage characteristics (Voc), etc., a difference between an actual output and a target output of the solar cell module SLM increases.

Therefore, the present disclosure presents a method for manufacturing the solar cell module SLM by performing learning based on cell information including the cell efficiency, cell voltage, and cell current and line information of a string line including the solar cell, predicting the output of the solar cell module including the solar cell based on the learning, and using an output prediction value of the solar cell module, at the time of manufacturing the solar cell module SLM in order to solve the disadvantage that the output dispersion of the solar cell module SLM increases.

To this end, the solar cell test apparatus 200 according to an embodiment of the present disclosure includes an interface (210a of FIG. 5) receiving cell information including the cell efficiency, cell voltage, and cell current and a processor (270 of FIG. 5) performing learning based on the cell information of the solar cell and line information of a string line including the solar cell, predicting an output of the solar cell module SLM including the solar cell based on the learning, and outputting an output prediction value of the solar cell module SLM. As a result, the output deviation of the solar cell module SLM including the plurality of solar cells can be reduced. Further, the production efficiency of the solar cell module SLM including the plurality of solar cells can be enhanced.

Meanwhile, the processor (270 of FIG. 5) may perform the learning based on the cell information of the solar cell, the line information of the string line including the solar cell, and module information of the solar cell module SLM including the string line, predict the output of the solar cell module SLM based on the learning, and output the output prediction value of the solar cell module SLM. As a result, the output deviation of the solar cell module SLM including the plurality of solar cells can be reduced.

Meanwhile, the solar cell classifying apparatus 400 according to an embodiment of the present disclosure may classify the rating of the solar cell based on the output prediction value of the solar cell module SLM from the solar cell test apparatus 200. As a result, the output deviation of the solar cell module SLM including the plurality of solar cells can be reduced.

Meanwhile, the solar cell module manufacturing apparatus 500 manufactures the solar cell module SLM including the plurality of solar cells according to the rating of the solar cell based on the output prediction value of the solar cell module SLM classified in the solar cell classifying apparatus 400. Accordingly, the production efficiency of the solar cell module SLM can be enhanced.

Meanwhile, the server 100 may perform learning by using the cell information of the solar cell and a plurality of learning models, select any one learning model of the plurality of learning models, and transmit the selected learning model to the solar cell test apparatus 200. As a result, the output deviation of the solar cell module SLM including the plurality of solar cells can be reduced based on an optimal learning model.

Figure 2:
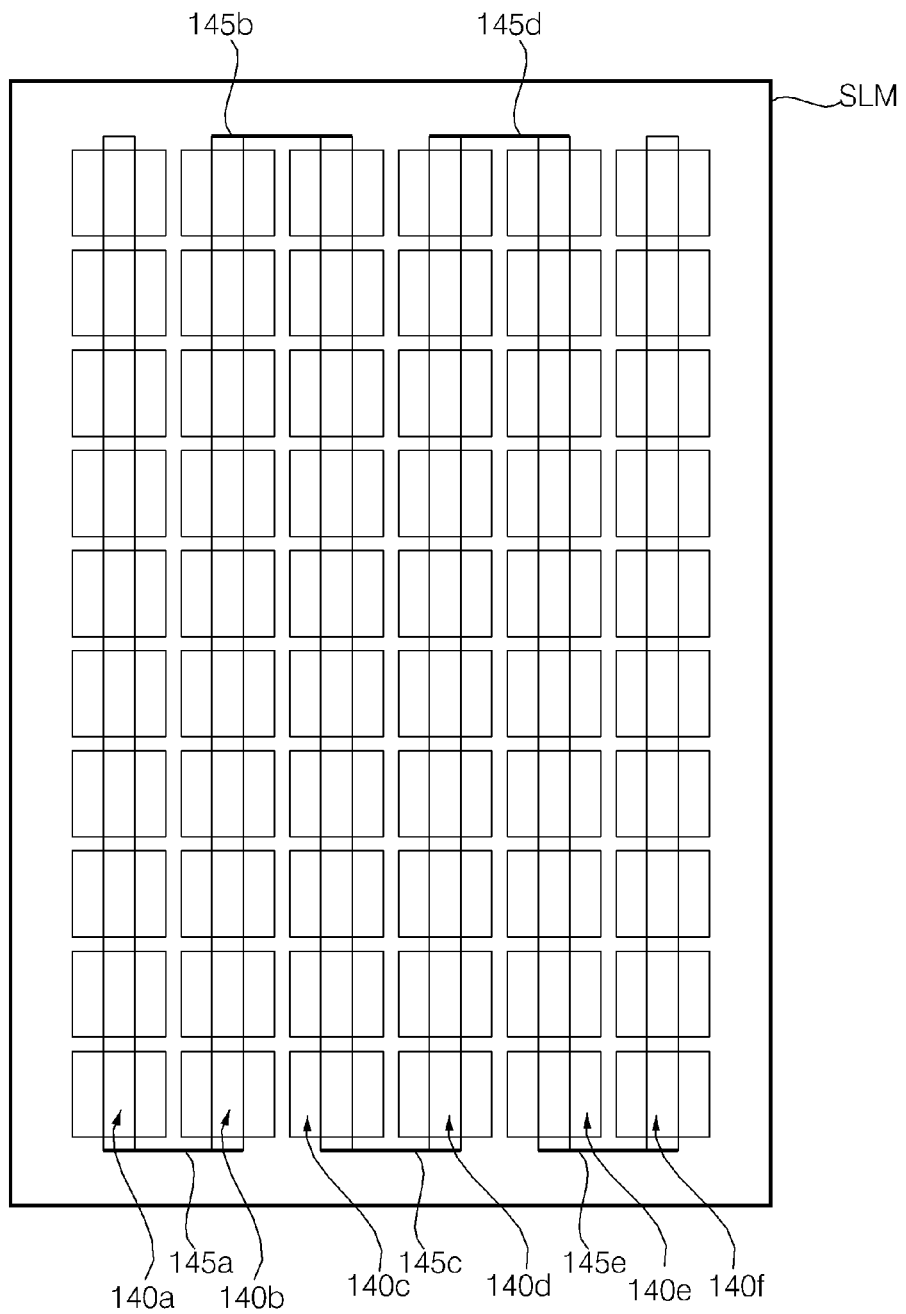
FIG. 2 is a front view of a solar cell module according to an embodiment of the present disclosure.

FIG. 2 is a front view of a solar cell module according to an embodiment of the present disclosure.

Referring to FIG. 2, the solar cell module SLM may include a plurality of solar cells.

Meanwhile, the solar cell module SLM may further include a first sealing material (not illustrated) and a second sealing material (not illustrated) located on the bottom and the top of the plurality of solar cells, a rear-surface substrate (not illustrated) located on the bottom of the first sealing material (not illustrated), and a front-surface substrate (not illustrated) located on the top of the second sealing material (not illustrated).

The solar cell as a semiconductor device that converts solar energy into electrical energy may be a silicon solar cell, a compound semiconductor solar cell, and a tandem solar cell.

The solar cell is constituted by a light receiving surface on which sunlight incident and a back surface which is opposite to the light receiving surface. For example, the solar cell may include a first conductive silicon substrate, a second conductive semiconductor layer formed on the silicon substrate and having a conductivity type opposite to a first conductivity type, an anti-reflection film including at least one opening for exposing a partial surface of the second conductive semiconductor layer and formed on the second conductive semiconductor layer, a front-surface electrode contacting a partial surface of the second conductive semiconductor layer exposed through at least one or more openings, and a rear-surface electrode formed on a rear surface of the silicon substrate.

Each solar cell may be electrically connected in series, in parallel, or in series-parallel. Specifically, the plurality of solar cells may be electrically connected by a ribbon (not illustrated). The ribbon (not illustrated) may be bonded to a front-surface electrode formed on a light receiving surface and a rear-surface electrode collecting electrode formed on a back surface of another adjacent solar cell.

In the figure, it is illustrated that the ribbon (not illustrated) is formed in two rows, and the solar cells are connected in line by the ribbon (not illustrated) to form a solar cell string line 140.

Therefore, as illustrated in the figure, six solar cell string lines 140a, 140b, 140c, 140d, 140e, and 140f may be formed and each string line may include ten solar cells. Unlike the figure, the number of solar cells per string line may be variously modified.

Meanwhile, each solar cell string line may be electrically connected by a bus ribbon.

FIG. 2 illustrates that a first solar cell string line 140a and a second solar cell string line 140b, a third solar cell string line 140c and a fourth solar cell string line 140d, and a fifth solar cell string line 140e and a sixth solar cell string line 140f are electrically connected by bus ribbons 145a, 145c, and 145e disposed below the solar cell module SLM, respectively.

Further, FIG. 2 illustrates that the second solar cell string line 140b and the third solar cell string line 140c and the fourth solar cell string line 140d and the fifth solar cell string line 140e are electrically connected by bus ribbons 145b and 145d disposed above the solar cell module SLM, respectively.

Meanwhile, a ribbon connected to a first string line, the bus ribbons 145b and 145d, and a ribbon connected to a fourth string line are electrically connected to first to fourth conductive lines (not shown), respectively and the first to fourth conductive lines are connected with a bypass diode (not illustrated) in a junction box (not illustrated) disposed on the rear surface of the solar cell module SLM.

For example, the first to fourth conductive lines may extend to the rear surface of the solar cell module SLM through the opening formed on the solar cell module SLM.

Figure 3:
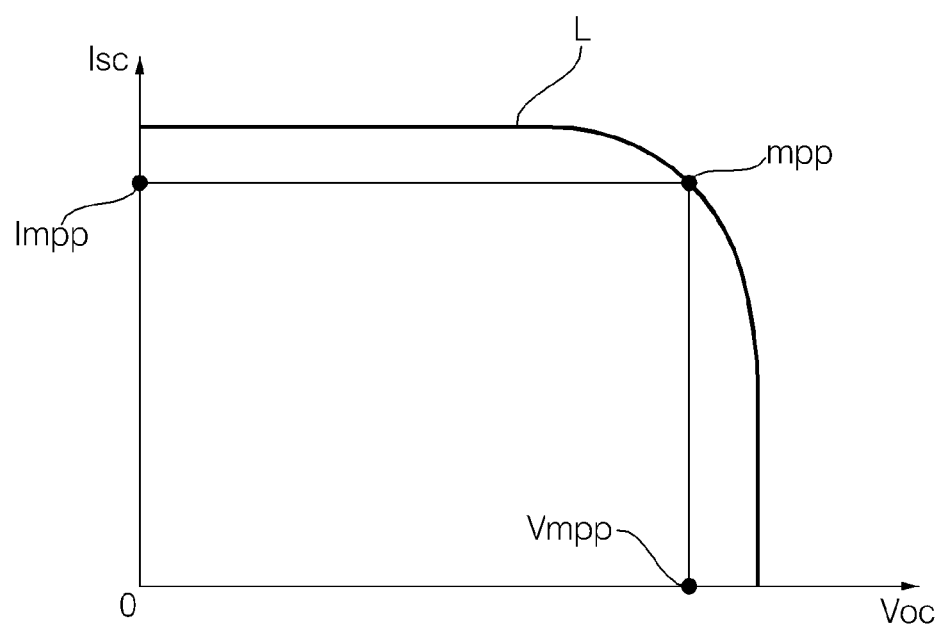
FIG. 3 illustrates a voltage versus current curve of the solar cell module FIG. 2.
Figure 4:
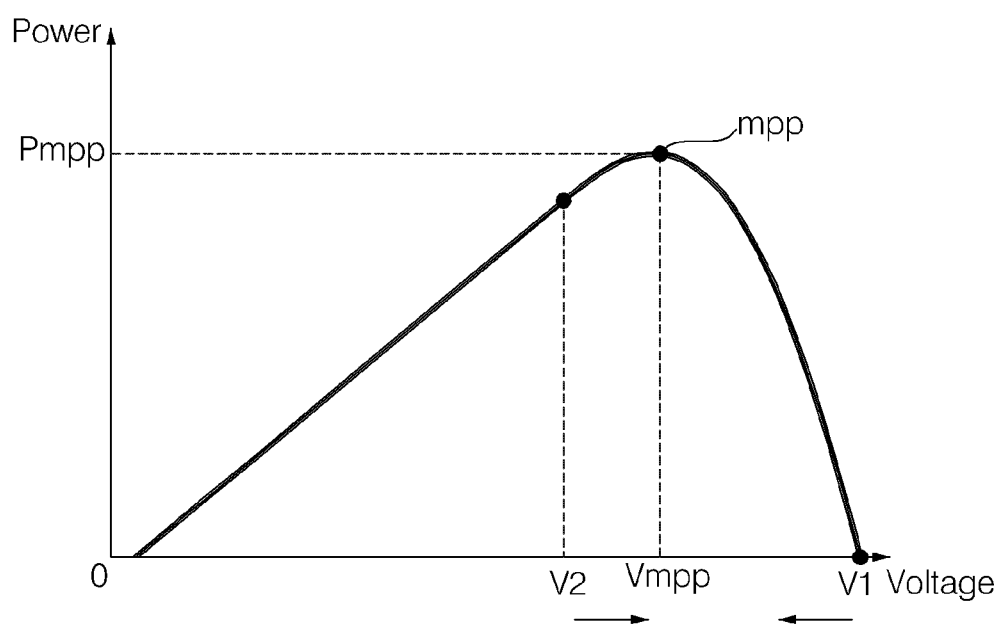
FIG. 4 illustrates a voltage versus power curve of the solar cell module FIG. 2.

FIG. 3 illustrates a voltage versus current curve of the solar cell module of FIG. 2 and FIG. 4 illustrates a voltage versus power curve of the solar cell module of FIG. 2.

First, referring to FIG. 3, as open voltage Voc supplied from the solar cell module SLM becomes larger, short current supplied from the solar cell module SLM becomes smaller. According to such a voltage-current curve L, the corresponding voltage Voc is stored in a capacitor unit (not illustrated) provided in the junction box (not illustrated).

Meanwhile, referring to FIG. 4, maximum power Pmpp supplied from the solar cell module SLM may be calculated by a maximum power point tracking (MPPT).

For example, while the opening voltage Voc is decreased from maximum voltage V1, the power is calculated for each voltage and it is determined whether the calculated power is the maximum power. Since the power increases from the voltage V1 to the voltage Vmpp, the calculated power is updated and stored. In addition, since the power decreases from the voltage Vmpp to the voltage V2, Pmpp corresponding to the voltage Vmpp is determined as the maximum power.

As such, when a hot spot does not occur, since only one inflection point occurs in the voltage-power curve L, the maximum power may be simply calculated only by exploring interval V1 to interval V2.

Figure 5:
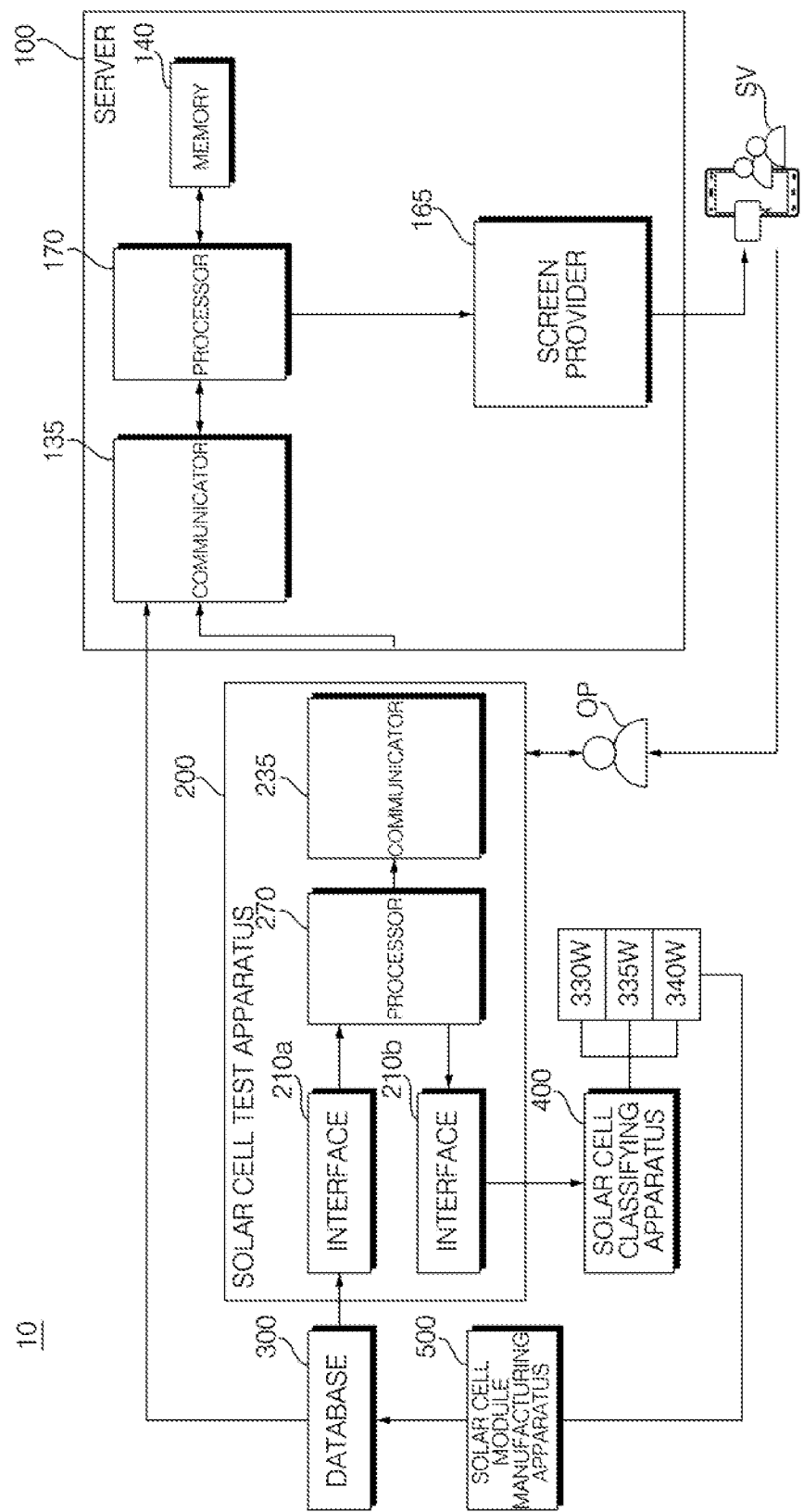
FIG. 5 is a schematic internal block diagram of the photovoltaic system of FIG. 1.

FIG. 5 is a schematic internal block diagram of the photovoltaic system of FIG. 1.

Referring to the figure, a photovoltaic system 10 according to an embodiment of the present disclosure may include a solar cell module SLM including a plurality of solar cells, a solar cell test apparatus 200 outputting an output prediction value of the solar cell module SLM, a solar cell classifying apparatus 400 classifying ratings of the solar cells, a solar cell module manufacturing apparatus 500 manufacturing the solar cells, a server 100, and a database 300 storing data for the solar cell.

The database 300 may store cell information including cell efficiency, cell voltage, and cell current of the solar cell.

Further, the database 300 may store cell information including the cell efficiency, cell voltage, and cell current of the solar cell, and resistance information and temperature information of the solar cell.

The solar cell test apparatus 200 according to an embodiment of the present disclosure performs learning based on the cell information including the cell efficiency, cell voltage, and cell current of the solar cell and the line information of the string line including the solar cell, predicts the output of the solar cell module SLM including the solar cell based on the learning, and outputs the output prediction value of the solar cell module SLM. As a result, the output deviation of the solar cell module SLM including the plurality of solar cells can be reduced. Further, the production efficiency of the solar cell module SLM including the plurality of solar cells can be enhanced.

The solar cell test apparatus 200 according to an embodiment of the present disclosure includes an interface 210a receiving cell information including the cell efficiency, cell voltage, and cell current and a processor 270 performing learning based on the cell information of the solar cell and line information of a string line including the solar cell, predicting an output of the solar cell module SLM including the solar cell based on the learning, and outputting an output prediction value of the solar cell module SLM. As a result, the output deviation of the solar cell module SLM including the plurality of solar cells can be reduced. Further, the production efficiency of the solar cell module SLM including the plurality of solar cells can be enhanced.

In this case, the interface 210a may receive cell information including cell efficiency, cell voltage Voc, and cell current Isc of the solar cell.

Alternatively, the interface 210a may receive, from the database 300, the cell information including the cell efficiency, cell voltage Voc, and cell current Isc of the solar cell, and the resistance information and temperature information of the solar cell.

Meanwhile, the cell information may include the cell efficiency, cell voltage Voc, and cell current Isc of the solar cell, and the resistance information and temperature information of the solar cell, maximum power point current information Imp, and maximum power point voltage information Vmp.

Meanwhile, the line information may include efficiency information, voltage information Voc, current information Isc, maximum power point current information Imp, maximum power point voltage information Vmp, process line information, and the like of the string line.

Meanwhile, the processor 270 may perform the learning based on the cell information of the solar cell, the line information of the string line including the solar cell, and module information of the solar cell module SLM including the string line, predict the output of the solar cell module SLM based on the learning, and output the output prediction value of the solar cell module SLM. As a result, the output deviation of the solar cell module SLM including the plurality of solar cells can be reduced.

Here, the module information may include efficiency information, voltage information Voc, current information Isc, maximum power point current information Imp, maximum power point voltage information Vmp, process module information, and the like of the solar cell module SLM.

The solar cell test apparatus 200 according to an embodiment of the present disclosure may further include a communicator 235 receiving the learning model from the server 100 and the processor 270 may perform the learning based on the learning model and predict the output of the solar cell module SLM based on the learning. As a result, the output deviation of the solar cell module SLM including the plurality of solar cells can be reduced.

The solar cell test apparatus according to an embodiment of the present disclosure may further include a second interface 210b transmitting the output prediction value of the solar cell module SLM to the solar cell classifying apparatus 400. As a result, the output deviation of the solar cell module SLM including the plurality of solar cells can be reduced.

Meanwhile, the cell information may further include resistance information and temperature information of the solar cell. As a result, the output deviation of the solar cell module SLM including the plurality of solar cells can be reduced.

Meanwhile, in case in which a cell rating is given based on the cell efficiency, the solar cell module SLM may include a solar cell of a reference value or more and in case in which the cell rating is given based on the output prediction value, the solar cell module SLM may include a solar cell having cell efficiency equal to or higher than a second reference value lower than the first reference value. As a result, the production efficiency of the solar cell module SLM including the plurality of solar cells can be enhanced.

Meanwhile, the solar cell classifying apparatus 400 according to an embodiment of the present disclosure may classify the rating of the solar cell based on the output prediction value of the solar cell module SLM from the solar cell test apparatus 200. As a result, the output deviation of the solar cell module SLM including the plurality of solar cells can be reduced.

For example, the solar cell classifying apparatus 400 may classify the plurality of solar cells CE1 to CE10 of FIG. 1 into a first rating for manufacturing a 330 W module, a second rating for manufacturing a 335 W module, a third rating for manufacturing a 340 W module, etc.

In the case of giving the cell rating based on the output prediction value of the present disclosure, a difference between an actual output and a target output of the solar cell module SLM decreases as compared with a case of giving the cell rating based on the cell efficiency in the related art. That is, the output dispersion of the solar cell module SLM is reduced.

Meanwhile, the solar cell module manufacturing apparatus 500 manufactures the solar cell module SLM including the plurality of solar cells according to the rating of the solar cell based on the output prediction value of the solar cell module SLM classified in the solar cell classifying apparatus 400. Accordingly, the production efficiency of the solar cell module SLM can be enhanced.

Meanwhile, the server 100 may perform learning by using the cell information of the solar cell and a plurality of learning models, select any one learning model of the plurality of learning models, and transmit the selected learning model to the solar cell test apparatus 200. As a result, the output deviation of the solar cell module SLM including the plurality of solar cells can be reduced. Further, the production efficiency of the solar cell module SLM including the plurality of solar cells can be enhanced.

Referring to the figure, the server 100 may include a communicator 135, a processor 170, a memory 140, and a screen provider 165.

The communicator 135 may exchange data with an external database 300 or the solar cell test apparatus 200.

For example, the communicator 135 may receive the cell information including the cell efficiency, cell voltage, and cell current of the solar cell from the database 300.

Alternatively, the communicator 135 may receive, from the database 300, the cell information including the cell efficiency, cell voltage, and cell current of the solar cell, and the resistance information and temperature information of the solar cell.

As another example, the communicator 135 may transmit the selected learning model to the solar cell test apparatus 200.

The memory 140 may store data required for the operation of the server 100.

For example, the memory 140 may store a plurality of learning models to be performed by the server 100.

In this case, the learning model may include a plurality of machine learning models and a plurality of regression analysis learning models.

Meanwhile, the processor 170 may control all operations of the server 100.

Meanwhile, the processor 170 may perform the learning for each of the plurality of learning models and predict the output of the solar cell module SLM based on the cell information including the cell efficiency, cell voltage, and cell current of the solar cell and the line information of the string line including the solar cell.

In addition, the processor 170 compares a prediction output and an actual output of the solar cell module SLM to select a learning model in which a prediction error is smallest.

In addition, the processor 170 may control information on the selected learning model to be transmitted to the solar cell test apparatus 200 through the communicator 135.

Meanwhile, the screen provider 165 may provide various learning results performed by the processor 170 through a graphical bottom surface for a user.

Meanwhile, in FIG. 5, it is illustrated that the solar cell test apparatus 200 and the solar cell classifying apparatus 400 are separate apparatuses, but unlike this, the solar cell test apparatus 200 and the solar cell classifying apparatus 400 may be implemented as one apparatus.

For example, when the solar cell test apparatus 200 and the solar cell classifying apparatus 400 are implemented while being integrated into the solar cell test apparatus 200, the solar cell test apparatus 200 according to another embodiment of the present disclosure includes an interface 210*a* receiving cell information including the cell efficiency, cell voltage, and cell current and a processor 270 performing learning based on the cell information of the solar cell and line information of a string line including the solar cell, predicting an output of the solar cell module SLM including the solar cell based on the learning, outputting an output prediction value of the solar cell module SLM, and classifying the rating of the solar cell based on the output prediction value of the solar cell module SLM. As a result, the output deviation of the solar cell module SLM including the plurality of solar cells can be reduced. Further, the production efficiency of the solar cell module SLM including the plurality of solar cells can be enhanced.

Meanwhile, the processor 270 may perform the learning based on the cell information of the solar cell, the line information of the string line including the solar cell, and module information of the solar cell module SLM including the string line, predict the output of the solar cell module SLM based on the learning, and output the output prediction value of the solar cell module SLM. As a result, the output deviation of the solar cell module SLM including the plurality of solar cells can be reduced.

Meanwhile, the solar cell test apparatus 200 according to another embodiment of the present disclosure may further include a communicator 235 receiving the learning model from the server 100 and the processor 270 may perform the learning based on the learning model and predict the output of the solar cell module SLM based on the learning. As a result, the output deviation of the solar cell module SLM including the plurality of solar cells can be reduced.

Meanwhile, in case in which a cell rating is given based on the cell efficiency, the solar cell module SLM may include a solar cell of a reference value or more and in case in which the cell rating is given based on the output prediction value, the solar cell module SLM may include a solar cell having cell efficiency equal to or higher than a second reference value lower than the first reference value. As a result, the production efficiency of the solar cell module SLM including the plurality of solar cells can be enhanced.

Figure 6A:
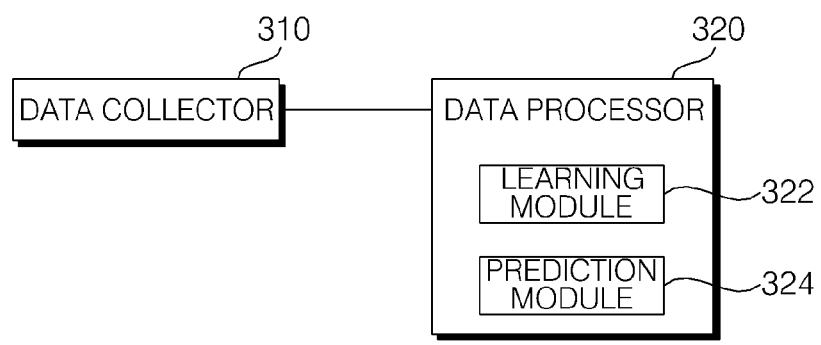
FIG. 6A illustrates an example of an internal block diagram of a processor of a server of FIG. 5.

FIG. 6A illustrates an example of an internal block diagram of a processor of a server of FIG. 5.

Referring to the figure, the processor 170 of the server 100 may include a data collector 310 and a data processor 320.

The data collector 310 may collect the cell information including the cell efficiency, cell voltage, and cell current of the solar cell from the database 300.

Alternatively, the data collector 310 may collect, from the database 300, the cell information including the cell efficiency, cell voltage, and cell current of the solar cell, and the resistance information and temperature information of the solar cell.

The data processor 320 includes a learning module 322 performing the learning based on the learning model and a prediction module 324 performing prediction based on the learning model.

The data processor 320 may perform the learning for each of the plurality of learning models and predict the output of the solar cell module SLM based on the cell information including the cell efficiency, cell voltage, and cell current of the solar cell and the line information of the string line including the solar cell.

In addition, the data processor 320 compares a prediction output and an actual output of the solar cell module SLM to select a learning model in which a prediction error is smallest.

In addition, the data processor 320 may control information on the selected learning model to be transmitted to the solar cell test apparatus 200 through the communicator 135.

Figure 6B:
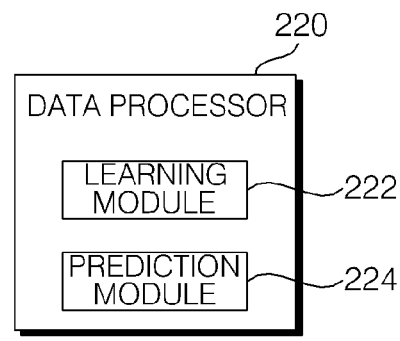
FIG. 6B illustrates an example of the internal block diagram of the test apparatus of a solar cell of FIG. 5.

FIG. 6B illustrates an example of the internal block diagram of the test apparatus of a solar cell of FIG. 5.

Referring to the figure, the processor 170 of the solar cell test apparatus 200 may include a data processor 220.

The data processor 220 includes a learning module 222 performing the learning based on the learning model and a prediction module 224 performing prediction based on the learning model.

The data processor 220 may perform the learning based on the cell information of the solar cell and the line information of the string line including the solar cell, predict the output of the solar cell module SLM based on the learning, and output the output prediction value of the solar cell module SLM.

Meanwhile, the data processor 220 may perform the learning based on the cell information of the solar cell, the line information of the string line including the solar cell, and module information of the solar cell module SLM including the string line, predict the output of the solar cell module SLM based on the learning, and output the output prediction value of the solar cell module SLM.

Meanwhile, the data processor 220 may perform the learning based on the learning model received from the server 100 and predict the output of the solar cell module SLM based on the learning. As a result, the output deviation of the solar cell module SLM including the plurality of solar cells can be reduced.

FIGS. 7 to 11D are diagrams referred for describing an operation of the photovoltaic system of FIG. 5.

Figure 7:
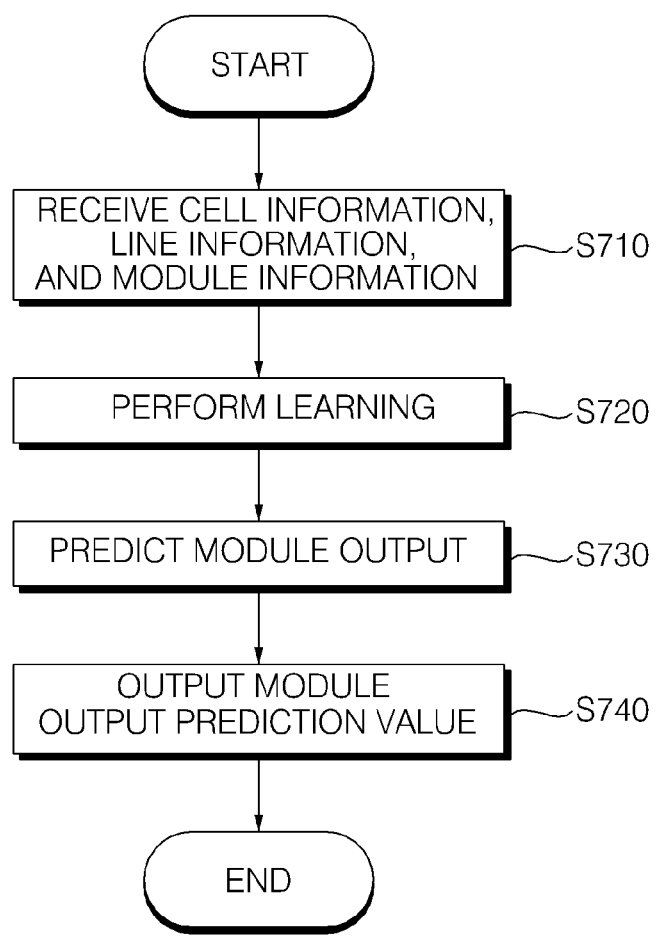
FIGS. 7 to 11D are diagrams referred for describing an operation of the photovoltaic system of FIG. 5.

First, FIG. 7 is a diagram illustrating an operation method of a solar cell test apparatus 200 according to an embodiment of the present disclosure.

Referring to the figure, the solar cell test apparatus 200 according to an embodiment of the present disclosure first receives cell information, line information, and module information from the database 300.

In addition, the processor 270 in the solar cell test apparatus 200 performs learning based on the cell information, the line information, and the module information (S720).

In addition, the processor 270 in the solar cell test apparatus 200 predicts a module output of the solar cell module SLM as a result of performing the learning (S730).

In addition, the processor 270 in the solar cell test apparatus 200 controls to output a module output value of the solar cell module SLM (S740).

As a result, the module output value of the solar cell module SLM is transferred to the solar cell classifying apparatus 400 through the second interface 210*b*.

Consequently, the solar cell classifying apparatus 400 may classify a plurality of solar cells for each rating based on the received module output value of the solar cell module SLM.

As a result, in the case of giving the cell rating based on the output prediction value of the present disclosure, a difference between the actual output and the target output of the solar cell module SLM decreases as compared with the case of giving the cell rating based on the cell efficiency in the related art. That is, the output dispersion of the solar cell module SLM is reduced.

Figure 8:
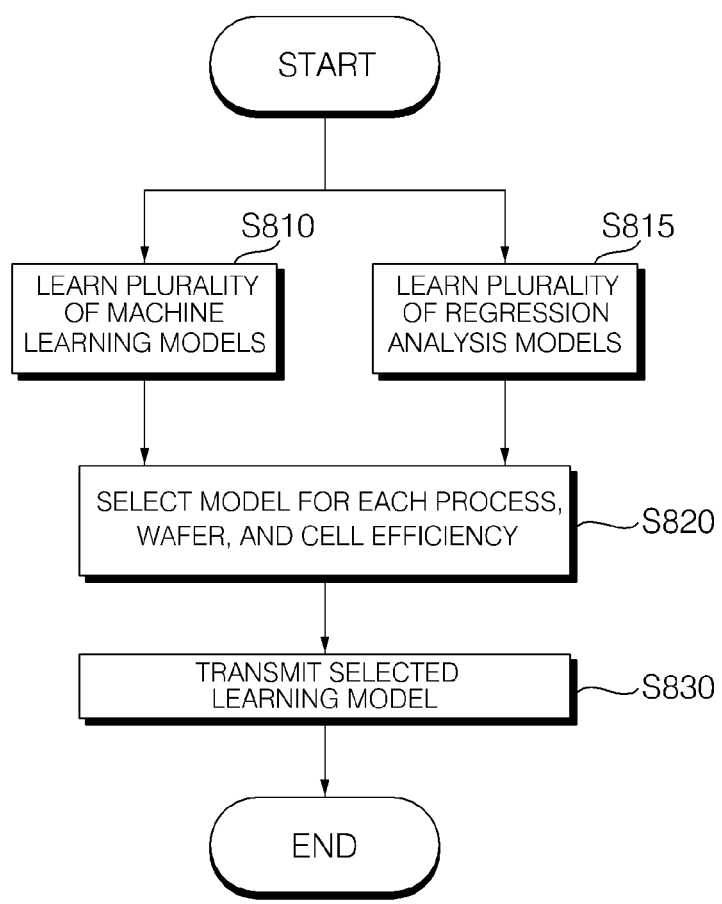

FIG. 8 is a diagram illustrating an operation method of a server 100 according to an embodiment of the present disclosure.

Referring to the figure, the server 100 according to an embodiment of the present disclosure first receives cell information, line information, and module information from the database 300 and performs learning by using a plurality of learning models based thereon.

In particular, the processor 170 of the server 100 may perform learning based on a plurality of machine learning models among the plurality of learning models (S810) and perform learning based on a plurality of regression analysis learning models (S815).

Meanwhile, the processor 170 of the server 100 may select any one of the plurality of learning models based on a process, a wafer, cell efficiency, and the like (S820).

In addition, the processor 170 of the server 100 may control to transmit the selected learning model to the solar cell test apparatus 200 (S830).

As a result, the selected learning model information is transferred to the solar cell test apparatus 200 through the communicator 135.

Consequently, the solar cell test apparatus 200 may perform the learning according to an optimal learning model and calculate the module output value of the solar cell module SLM based thereon.

Figure 9:
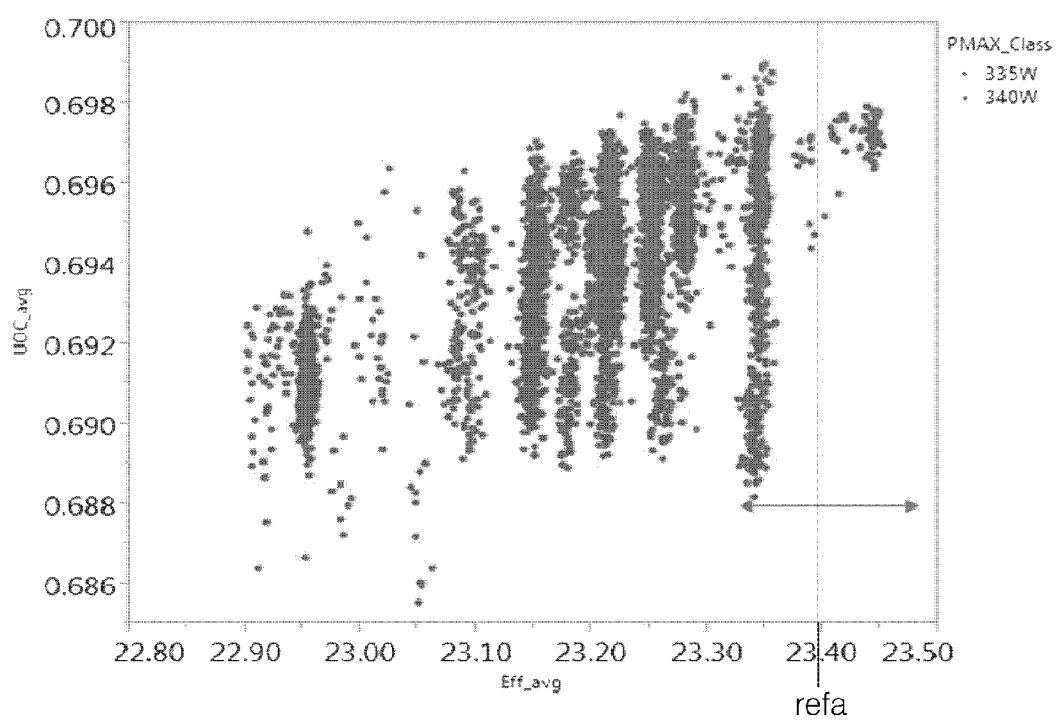

FIG. 9 is a diagram illustrating module output data compared with cell efficiency.

Referring the figure, a horizontal axis indicates the cell efficiency of the solar cell and a vertical axis indicates the module output data.

At the time of manufacturing the solar cell module based on the cell efficiency in the related art, due to the output dispersion of the module, the solar cell module should be manufactured by using only a solar cell in which the cell efficiency is equal to or more than a first reference value ref. Accordingly, the production efficiency of the solar cell module is low.

However, according to an embodiment of the present disclosure, when the solar cell module is manufactured, since the cell current, the cell voltage, the line information, etc., are further considered in addition to the cell efficiency, a solar cell in which the cell efficiency is less than the first reference value ref may also be used. Accordingly, the production efficiency of the solar cell module including the plurality of solar cells can be enhanced.

FIG. 10A is a diagram illustrating a difference between cell efficiency depending on prediction A and prediction B, and actual cell efficiency.

Referring to the figure, prediction A corresponds to cell rating prediction based on the cell efficiency in the related art and prediction B corresponds to cell rating prediction based on the cell efficiency, the cell current, the cell voltage, the line information, etc., according to an embodiment of the present disclosure.

For example, when the output of the solar cell module is 335 W, the cell efficiency of prediction A is predicted as 23.0% and the cell efficiency of prediction B is predicted as 22.95%, and the actual cell efficiency is measured as 22.96%. Accordingly, it can be seen that prediction B is more accurate than prediction A.

As another example, when the output of the solar cell module is 340 W, the cell efficiency of prediction A is predicted as 23.4% and the cell efficiency of prediction B is predicted as 23.24%, and the actual cell efficiency is measured as 23.25%. Accordingly, it can be seen that prediction B is more accurate than prediction A.

Figure 10B:
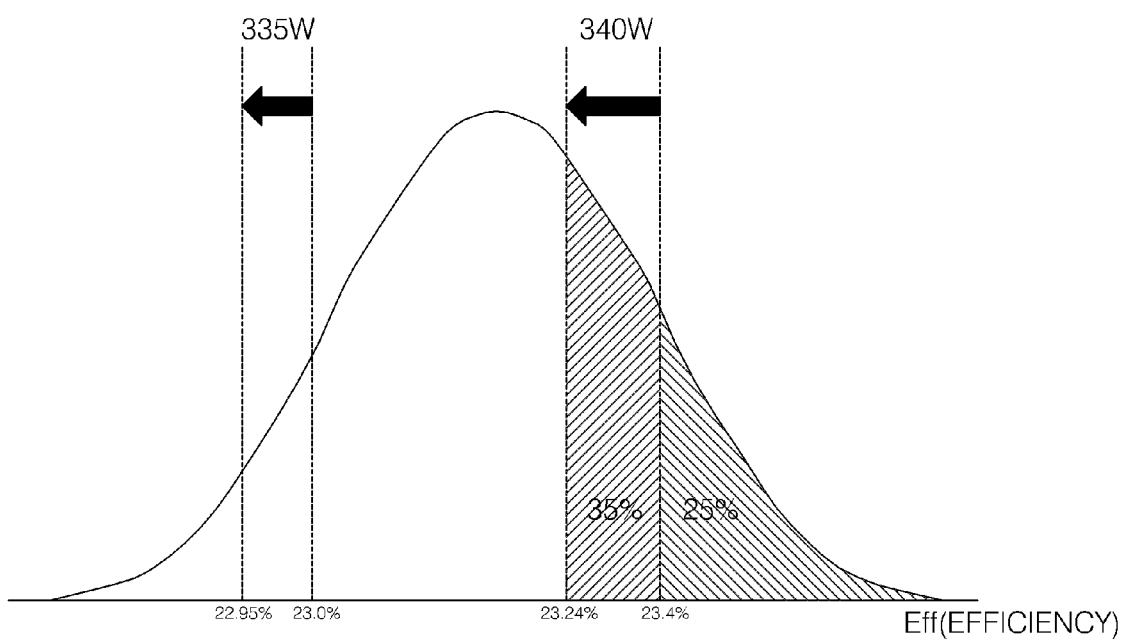

FIG. 10B is a diagram illustrating a reference value at the time of manufacturing a module based on cell efficiency in the related art and a reference value at the time of manufacturing the module according to the present disclosure.

At the time of manufacturing the solar cell module of 340 W, when the solar cell module of 340 W is manufactured based on the cell efficiency in the related art, the solar cell module should be manufactured by using only the solar cell having cell efficiency of the first reference value or more. In this case, the first reference value may be approximately 23.4%.

However, according to an embodiment of the present disclosure, at the time of manufacturing the solar cell module of 340 W, the solar cell module may be manufactured by using a solar cell having cell efficiency equal to or higher than a second reference value lower than the first reference value. In this case, the second reference value may be approximately 23.24%.

Accordingly, as compared with using a solar cell of 25% in the related art, since a solar cell of 35% may be used in the present disclosure, the production efficiency of the solar cell module may be enhanced at the time of manufacturing the solar cell module.

At the time of manufacturing the solar cell module of 335 W, when the solar cell module of 335 W is manufactured based on the cell efficiency in the related art, the solar cell module should be manufactured by using only the solar cell having cell efficiency of the first reference value or more. In this case, the first reference value may be approximately 23.0%.

However, according to an embodiment of the present disclosure, at the time of manufacturing the solar cell module of 335 W, the solar cell module may be manufactured by using a solar cell having cell efficiency equal to or higher than a second reference value lower than the first reference value. In this case, the second reference value may be approximately 22.95%.

Accordingly, as compared with the related art, since more solar cells may be used in the present disclosure, the production efficiency of the solar cell module may be enhanced at the time of manufacturing the solar cell module.

Figure 11A:
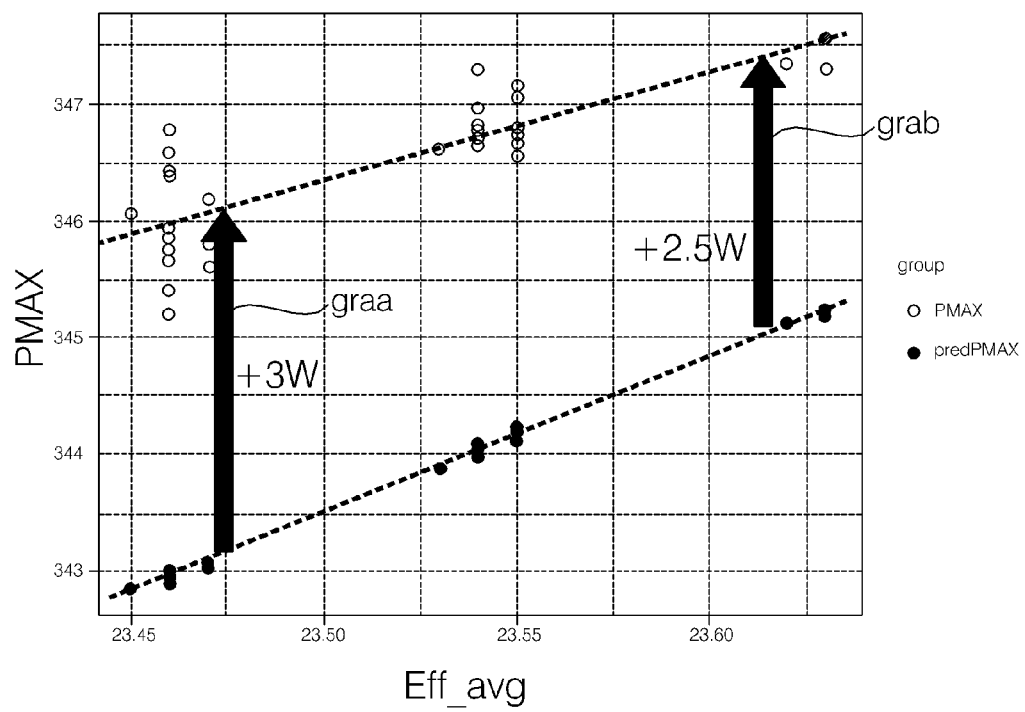

FIG. 11A illustrates an efficiency versus maximum output graph of a solar cell module in the related art and an efficiency versus maximum output graph of a solar cell module in the present disclosure.

Referring to the figure, a lower graph shows the efficiency versus maximum output graph of the solar cell module in the related art and an upper graph shows an efficiency versus maximum output graph of the solar cell module in the present disclosure.

graa shows that a level of the efficiency versus maximum output graph of the solar cell module in the present disclosure is higher than that of the efficiency versus maximum output graph of the solar cell module in the related art by approximately 3 W or more at the time of manufacturing the solar cell module of 335 W.

grab shows that a level of the efficiency versus maximum output graph of the solar cell module in the present disclosure is higher than that of the efficiency versus maximum output graph of the solar cell module in the related art by approximately 3 W or more at the time of manufacturing the solar cell module of 340 W.

Consequently, when the solar cell module is manufactured according to the present disclosure, maximum output power of the solar cell module further increases as compared with the related art.

Figure 11B:
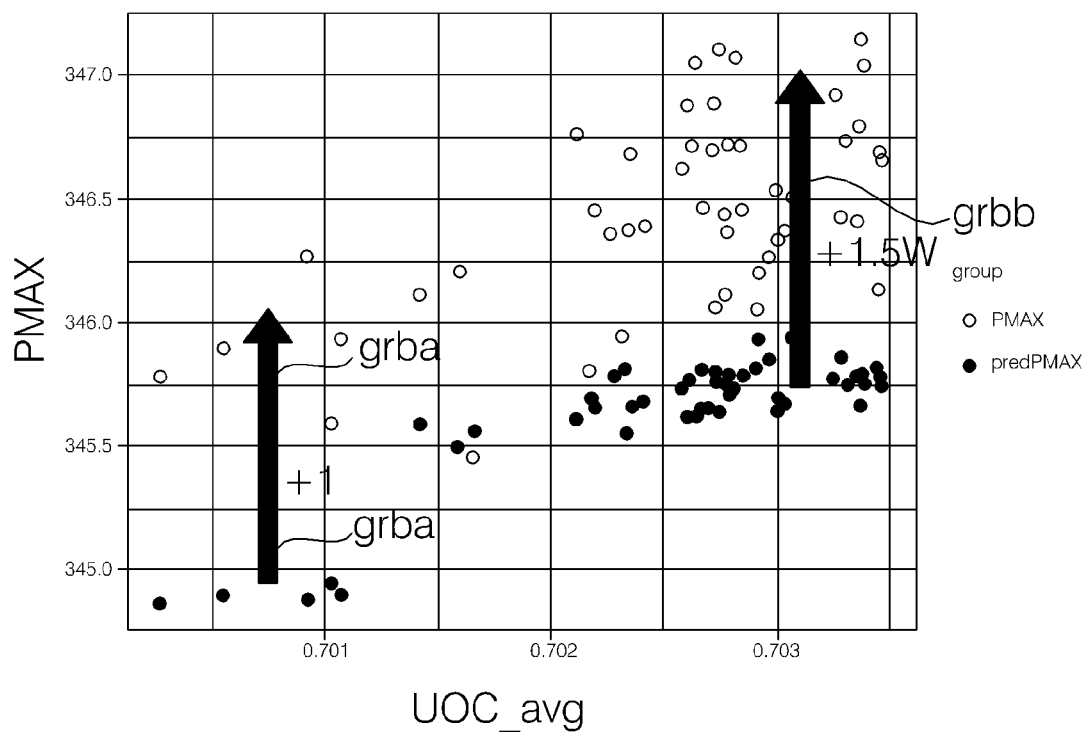

FIG. 11B illustrates a voltage versus maximum output graph of a solar cell module in the related art and a voltage versus maximum output graph of a solar cell module in the present disclosure.

Referring to the figure, grba shows that the level of the voltage versus maximum output graph of the solar cell module in the present disclosure is higher than that of the voltage versus maximum output graph of the solar cell module in the related art by approximately 1 W or more at the time of manufacturing the solar cell module of 335 W.

grbb shows that the level of the voltage versus maximum output graph of the solar cell module in the present disclosure is higher than that of the voltage versus maximum output graph of the solar cell module in the related art by approximately 1.5 W or more at the time of manufacturing the solar cell module of 340 W.

Consequently, when the solar cell module is manufactured according to the present disclosure, the maximum output power of the solar cell module further increases as compared with the related art.

Figure 11C:
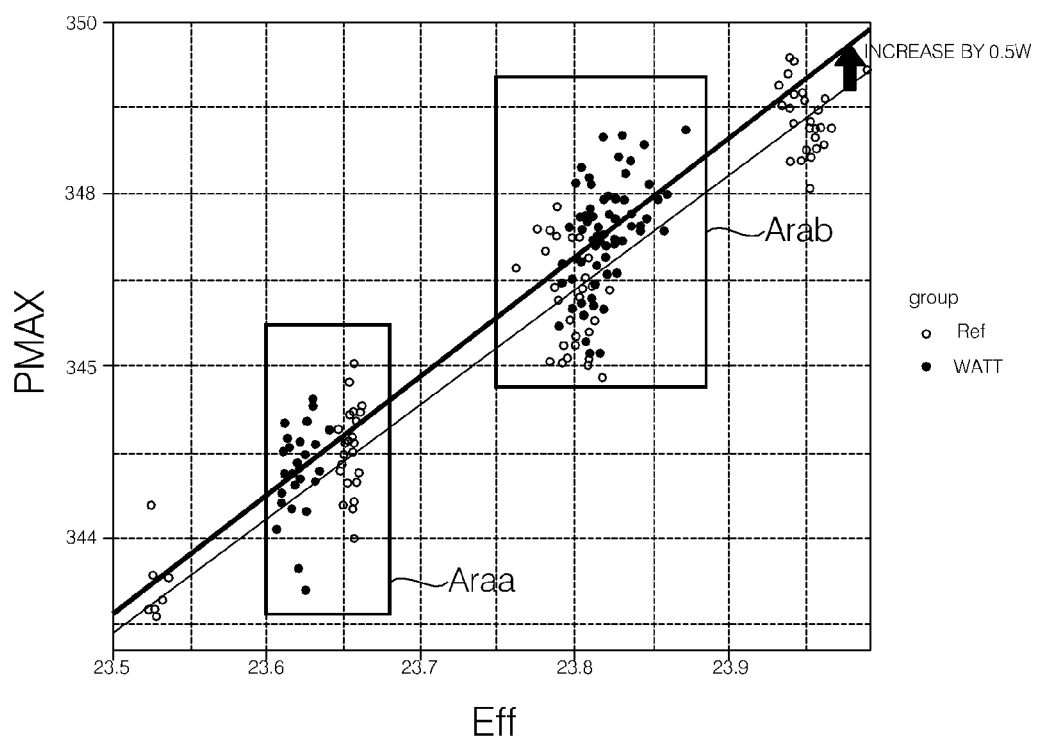

FIG. 11C illustrates a power versus maximum output graph of a solar cell module in the related art and a power versus maximum output graph of a solar cell module in the present disclosure.

Referring to the figure, Araa shows that the level of the power versus maximum output graph of the solar cell module in the present disclosure is higher than that of the power versus maximum output graph of the solar cell module in the related art by approximately 0.5 W or more at the time of manufacturing the solar cell module of 335 W.

Arab shows that the level of the output versus maximum output of the solar cell module in the present disclosure is higher than that of the output versus maximum output of the solar cell module in the related art by approximately 0.5 W or more at the time of manufacturing the solar cell module of 340 W.

Consequently, when the solar cell module is manufactured according to the present disclosure, the maximum output power of the solar cell module further increases as compared with the related art.

Figure 11D:
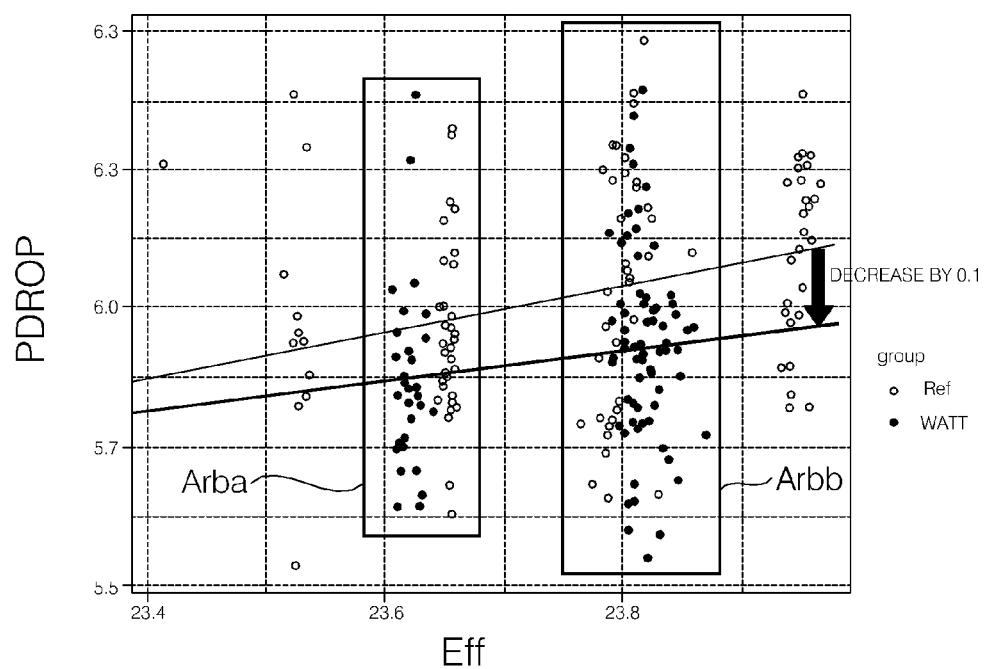

FIG. 11D illustrates a power versus power loss graph of a solar cell module in the related art and a power versus power loss graph of a solar cell module in the present disclosure.

Referring to the figure, Arba shows that the level of the power versus power loss of the solar cell module in the present disclosure is lower than that of the power versus power loss of the solar cell module in the related art by approximately 0.1 or more at the time of manufacturing the solar cell module of 335 W.

Arbb shows that the level of the efficiency versus power loss of the solar cell module in the present disclosure is lower than that of the output versus power loss of the solar cell module in the related art by approximately 0.1 or more at the time of manufacturing the solar cell module of 340 W.

Consequently, when the solar cell module is manufactured according to the present disclosure, the power loss of the solar cell module further decreases as compared with the related art.

As described above, the configurations and the methods of the embodiments described above may not be limitedly applied to the test apparatus of a solar cell and the photovoltaic system including the same according to the embodiments of the present disclosure, but the embodiments may be configured by selectively combining all or some of the respective embodiments so as to be variously modified.

Further, although the preferred embodiments of the present disclosure have been illustrated and described above, the present disclosure is not limited to the aforementioned specific embodiments, various modifications may be made by those skilled in the art in the technical field to which the present disclosure pertains without departing from the subject matters of the present disclosure that are claimed in the claims, and these modifications should not be appreciated individually from the technical spirit or prospect of the present disclosure.

The test apparatus of a solar cell according to an embodiment of the present disclosure includes an interface to receive cell information including cell efficiency, cell voltage, and cell current and a processor to perform learning based on the cell information of the solar cell and line information of a string line including the solar cell, predict an output of a solar cell module including the solar cell based on the learning, and output an output prediction value of the solar cell module. As a result, an output deviation of the solar cell module including a plurality of solar cells can be reduced. Further, production efficiency of the solar cell module including the plurality of solar cells can be enhanced.

Meanwhile, the processor can perform the learning based on the cell information of the solar cell, the line information of the string line including the solar cell, and module information of the solar cell module including the string line, predict the output of the solar cell module based on the learning, and output the output prediction value of the solar cell module. As a result, the output deviation of the solar cell module including the plurality of solar cells can be reduced.

The test apparatus of a solar cell according to the embodiment of the present disclosure may further include a communicator to receive a learning model from a server and the processor may perform the learning based on the learning model and predict the output of the solar cell module based on the learning. As a result, the output deviation of the solar cell module including the plurality of solar cells can be reduced.

The test apparatus of a solar cell according to the embodiment of the present disclosure may further include a second interface to transmit the output prediction value of the solar cell module to a solar cell classifying apparatus. As a result, the output deviation of the solar cell module including the plurality of solar cells can be reduced.

Meanwhile, the cell information may further include resistance information and temperature information of the solar cell. As a result, the output deviation of the solar cell module including the plurality of solar cells can be reduced.

Meanwhile, in case in which a cell rating is given based on the cell efficiency, the solar cell module may include a solar cell of a reference value or more and in case in which the cell rating is given based on the output prediction value, the solar cell module may include a solar cell having cell efficiency equal to or higher than a second reference value lower than the first reference value. As a result, the production efficiency of the solar cell module including the plurality of solar cells can be enhanced.

A photovoltaic system according to an embodiment of the present disclosure includes a test apparatus of a solar cell, which receives cell efficiency, cell voltage, and cell current of the solar cell, performs learning based on cell information of the solar cell and line information of a string line including the solar cell, outputs an output of a solar cell module including the solar cell, and outputs an output prediction value of the solar cell module, and a solar cell classifying apparatus to classify ratings of the solar cell based on the output prediction value of the solar cell module from the test apparatus of a solar cell. As a result, the output deviation of the solar cell module including the plurality of solar cells can be reduced. Further, the production efficiency of the solar cell module including the plurality of solar cells can be enhanced.

Meanwhile, the solar cell classifying apparatus may classify the ratings of the solar cell for each output power of the solar cell module. As a result, the output deviation of the solar cell module including the plurality of solar cells can be reduced.

Meanwhile, the test apparatus of a solar cell may perform the learning based on the cell information of the solar cell, the line information of the string line including the solar cell, and module information of the solar cell module including the string line, predict the output of the solar cell module based on the learning, and output the output prediction value of the solar cell module. As a result, the output deviation of the solar cell module including the plurality of solar cells can be reduced.

The photovoltaic system according to the embodiment of the present disclosure may further include a server which performs learning by using the cell information of the solar cell and a plurality of learning models, selects any one learning model of a plurality of learning models, and transmits the selected learning model to the test apparatus of a solar cell. As a result, the output deviation of the solar cell module including the plurality of solar cells can be reduced based on an optimal learning model.

Meanwhile, the test apparatus of a solar cell may perform learning based on the learning model received from the server and predict the output of the solar cell module based on the learning. As a result, the output deviation of the solar cell module including the plurality of solar cells can be reduced.

Meanwhile, the plurality of learning models may include a plurality of machine learning models and a plurality of regression analysis learning models. As a result, the output deviation of the solar cell module including the plurality of solar cells can be reduced.

Meanwhile, the cell information may further include resistance information and temperature information of the solar cell. As a result, the output deviation of the solar cell module including the plurality of solar cells can be reduced.

Meanwhile, in case in which a cell rating is given based on the cell efficiency, the solar cell module may include a solar cell of a reference value or more and in case in which the cell rating is given based on the output prediction value, the solar cell module may include a solar cell having cell efficiency equal to or higher than a second reference value lower than the first reference value. As a result, the production efficiency of the solar cell module including the plurality of solar cells can be enhanced.

A test apparatus of a solar cell according to another embodiment of the present disclosure includes an interface to receive cell information including cell efficiency, cell voltage, and cell current and a processor to perform learning based on the cell information of the solar cell and line information of a string line including the solar cell, predict an output of a solar cell module including the solar cell based on the learning, output an output prediction value of the solar cell module, and classify ratings of the solar cell based on the output prediction value of the solar cell module. As a result, the output deviation of the solar cell module including the plurality of solar cells can be reduced. Further, the production efficiency of the solar cell module including the plurality of solar cells can be enhanced.

Meanwhile, the processor can perform the learning based on the cell information of the solar cell, the line information of the string line including the solar cell, and module information of the solar cell module including the string line, predict the output of the solar cell module based on the learning, and output the output prediction value of the solar cell module. As a result, the output deviation of the solar cell module including the plurality of solar cells can be reduced.

The test apparatus of a solar cell according to another embodiment of the present disclosure may further include a communicator to receive a learning model from a server and the processor may perform the learning based on the learning model and predict the output of the solar cell module based on the learning. As a result, the output deviation of the solar cell module including the plurality of solar cells can be reduced.

Meanwhile, the cell information may further include resistance information and temperature information of the solar cell. As a result, the output deviation of the solar cell module including the plurality of solar cells can be reduced.

Meanwhile, in case in which a cell rating is given based on the cell efficiency, the solar cell module may include a solar cell of a reference value or more and in case in which the cell rating is given based on the output prediction value, the solar cell module may include a solar cell having cell efficiency equal to or higher than a second reference value lower than the first reference value. As a result, the production efficiency of the solar cell module including the plurality of solar cells can be enhanced.

What is claimed is:
1. A test apparatus of a solar cell, comprising:
a transceiver to receive a learning model from a server;
an interface to receive cell information including cell efficiency, cell voltage, and cell current of a solar cell; and
a processor to perform learning using the learning model and based on the cell information of the solar cell and line information of a string line including the solar cell, predict an output of a solar cell module including the solar cell based on the learning, and output an output prediction value of the solar cell module, wherein in case in which a cell rating is given based on the cell efficiency, the solar cell module includes a solar cell of a first reference value or more, and in case in which the cell rating is given based on the output prediction value, the solar cell module includes a solar cell having cell efficiency equal to or higher than a second reference value that is lower than the first reference value.

2. The test apparatus of a solar cell of claim 1, wherein the processor performs the learning based on the cell information of the solar cell, the line information of the string line including the solar cell, and module information of the solar cell module including the string line, predicts the output of the solar cell module based on the learning, and outputs the output prediction value of the solar cell module.

3. The test apparatus of a solar cell of claim 1, further comprising:
a second interface to transmit the output prediction value of the solar cell module.

4. The test apparatus of a solar cell of claim 1, wherein the cell information further includes resistance information and temperature information of the solar cell.

5. A photovoltaic system comprising:
a solar cell test apparatus including a transceiver to receive a learning model from a server and to receive cell information including cell efficiency, cell voltage, and cell current of a solar cell, and a processor to perform learning using the learning model and based on the cell information of the solar cell and line information of a string line including the solar cell, predict an output of a solar cell module including the solar cell based on the learning, and output an output prediction value of the solar cell module;
a solar cell classifying apparatus to classify a rating of the solar cell based on the output prediction value of the solar cell module from the solar cell test apparatus; and
the server to perform learning by using the cell information of the solar cell and a plurality of learning models, select any one learning model of the plurality of learning models, and transmit the selected learning model to the solar cell test apparatus.

6. The photovoltaic system of claim 5, wherein the solar cell classifying apparatus classifies the rating of the solar cell for each output power of the solar cell module.

7. The photovoltaic system of claim 5, wherein the solar cell test apparatus performs the learning based on the cell information of the solar cell, the line information of the string line including the solar cell, and module information of the solar cell module including the string line, predicts the output of the solar cell module based on the learning, and outputs the output prediction value of the solar cell module.

8. The photovoltaic system of claim 5, wherein the solar cell test apparatus performs the learning based on the learning model received from the server and predicts the output of the solar cell module based on the learning.

9. The photovoltaic system of claim 5, wherein the plurality of learning models includes a plurality of machine learning models and a plurality of regression analysis learning models.

10. The photovoltaic system of claim 5, wherein the cell information further includes resistance information and temperature information of the solar cell.

11. The photovoltaic system of claim 5, wherein in case in which a cell rating is given based on the cell efficiency, the solar cell module includes a solar cell of a first reference value or more, and in case in which the cell rating is given based on the output prediction value, the solar cell module includes a solar cell having cell efficiency equal to or higher than a second reference value that is lower than the first reference value.

12. A test apparatus of a solar cell, comprising:
an interface to receive cell information including cell efficiency, cell voltage, and cell current of a solar cell;
a transceiver to receive a learning model from a server; and
a processor to perform learning using the learning model and based on the cell information of the solar cell and line information of a string line including the solar cell, predict an output of a solar cell module including the solar cell based on the learning, output an output prediction value of the solar cell module, and classify a rating of the solar cell based on the output prediction value of the solar cell module, wherein in case in which a cell rating is given based on the cell efficiency, the solar cell module includes a solar cell of a first reference value or more, and in case in which the cell rating is given based on the output prediction value, the solar cell module includes a solar cell having cell efficiency equal to or higher than a second reference value that is lower than the first reference value.

13. The test apparatus of a solar cell of claim 12, wherein the processor performs the learning based on the cell information of the solar cell, the line information of the string line including the solar cell, and module information of the solar cell module including the string line, predicts the output of the solar cell module based on the learning, and outputs the output prediction value of the solar cell module.

14. The test apparatus of a solar cell of claim 12, wherein the cell information further includes resistance information and temperature information of the solar cell.

* * * * *